(12) United States Patent
Thompson et al.

(10) Patent No.: US 12,260,766 B2
(45) Date of Patent: **\*Mar. 25, 2025**

(54) METHOD FOR INTERACTIVE HEADS-UP DISPLAY AND CONTROL OF TRAFFIC TARGETS

(71) Applicant: Rockwell Collins, Inc., Cedar Rapids, IA (US)

(72) Inventors: Bradley R. Thompson, Cedar Rapids, IA (US); Sarah Barber, Cedar Rapids, IA (US); Felix B. Turcios, Cedar Rapids, IA (US)

(73) Assignee: Rockwell Collins, Inc., Cedar Rapids, IA (US)

( \* ) Notice: Subject to any disclaimer, the term of this patent is extended or adjusted under 35 U.S.C. 154(b) by 382 days.

This patent is subject to a terminal disclaimer.

(21) Appl. No.: 17/116,415

(22) Filed: Dec. 9, 2020

(65) Prior Publication Data

US 2022/0180758 A1 Jun. 9, 2022

(51) Int. Cl.
*G08G 5/00* (2006.01)
*B64D 43/02* (2006.01)
(Continued)

(52) U.S. Cl.
CPC .......... *G08G 5/0073* (2013.01); *B64D 43/02* (2013.01); *G06F 3/04817* (2013.01); *G08G 5/04* (2013.01)

(58) Field of Classification Search
CPC ........ G08G 5/0073; G08G 5/04; G08G 5/065; G08G 5/0021; G08G 5/0013; B64D 43/02; G06F 3/04817
See application file for complete search history.

(56) References Cited

U.S. PATENT DOCUMENTS 6,236,398 B1    5/2001  Kojima et al.
6,567,014 B1 \*  5/2003  Hansen .................. G01C 23/00
                                                        340/975
(Continued)

FOREIGN PATENT DOCUMENTS

EP          2211146 B1      7/2010
EP          2884380 A1      6/2015
(Continued)

OTHER PUBLICATIONS

Extended Search Report in European Application No. 21213512.3 dated May 2, 2022. 8 pages.
(Continued)

*Primary Examiner* — Tyler J Lee
(74) *Attorney, Agent, or Firm* — Suiter Swantz LLP

(57) ABSTRACT

A method for heads-up control and interactive display of traffic targets via a heads-up display (HUD) includes: receiving position data from proximate aircraft (e.g., within a threshold range); arranging the aircraft into an ordered sequence based on proximity or other criteria; overlaying interactive symbology onto the HUD synthetic display corresponding to the proximate aircraft (including any aircraft within range but outside the HUD field of view, e.g., behind the aircraft or pilot); accepting control input from a user via a heads-up controller (e.g., manual control or voice command) and focusing a cursor on each proximate aircraft in sequence based on the control input; selecting, via the heads-up controller, focused aircraft via the heads-up controller; and designating, via the heads-up controller, selected aircraft for CDTI Assisted Visual Separation (CAVS) or other traffic applications.

14 Claims, 13 Drawing Sheets

(51) Int. Cl.
  *G06F 3/00* (2006.01)
  *G06F 3/04817* (2022.01)
  *G08G 5/04* (2006.01)

(56) References Cited

U.S. PATENT DOCUMENTS

| | | | |
|---|---|---|---|
| 6,795,097 | B1 | 9/2004 | Yamaguchi et al. |
| 7,296,242 | B2 | 11/2007 | Agata et al. |
| 7,342,514 | B1 | 3/2008 | Bailey et al. |
| 7,434,171 | B2 | 10/2008 | Clapper |
| 8,041,504 | B2 | 10/2011 | Shafaat et al. |
| 8,742,952 | B1 | 6/2014 | Bold |
| 9,063,569 | B2 | 6/2015 | Tanaka et al. |
| 10,170,010 | B1 | 1/2019 | McCusker et al. |
| 10,302,759 | B1 | 5/2019 | Arteaga |
| 10,347,140 | B2 | 7/2019 | Kneuper et al. |
| 10,598,932 | B1 | 3/2020 | Marshall |
| 10,713,960 | B1 | 7/2020 | Ziarnick et al. |
| 10,810,887 | B2 | 10/2020 | Servantie et al. |
| 11,366,327 | B1 * | 6/2022 | Thompson ......... G02B 27/0179 |
| 2003/0043121 | A1 | 3/2003 | Chen |
| 2003/0128241 | A1 | 7/2003 | Watanabe et al. |
| 2006/0265109 | A1 | 11/2006 | Canu-Chiesa et al. |
| 2009/0153343 | A1 | 6/2009 | Shafaat et al. |
| 2010/0117930 | A1 | 5/2010 | Bacabara et al. |
| 2010/0201544 | A1 | 8/2010 | Ganille et al. |
| 2010/0309025 | A1 | 12/2010 | Ganille et al. |
| 2013/0006511 | A1 * | 1/2013 | Ramaiah ............. G08G 5/0004 701/120 |
| 2013/0169450 | A1 | 7/2013 | He |
| 2014/0104080 | A1 | 4/2014 | Maddanimath et al. |
| 2014/0380243 | A1 | 12/2014 | Furue et al. |
| 2015/0332593 | A1 | 11/2015 | Munns et al. |
| 2016/0077730 | A1 | 3/2016 | Shim |
| 2016/0284220 | A1 | 9/2016 | Kar et al. |
| 2016/0368593 | A1 | 12/2016 | Miller |
| 2017/0243498 | A1 * | 8/2017 | Reddy ................. G08G 5/0086 |
| 2017/0259935 | A1 | 9/2017 | Hausmann et al. |
| 2018/0081181 | A1 | 3/2018 | Lambert et al. |
| 2018/0194486 | A1 | 7/2018 | Lux et al. |
| 2018/0233051 | A1 | 8/2018 | Manberg et al. |
| 2018/0315321 | A1 * | 11/2018 | Servantie ............... G01C 23/00 |
| 2018/0315322 | A1 | 11/2018 | Servantie et al. |
| 2019/0049268 | A1 | 2/2019 | Mohan et al. |
| 2019/0244529 | A1 | 8/2019 | Manberg |
| 2020/0122575 | A1 | 4/2020 | Chion et al. |
| 2020/0312160 | A1 | 10/2020 | Manberg et al. |

FOREIGN PATENT DOCUMENTS

| | | |
|---|---|---|
| EP | 3031656 B1 | 1/2018 |
| JP | 2009276993 A | 11/2009 |
| WO | 2008152732 A1 | 12/2008 |
| WO | 2009035757 A2 | 3/2009 |
| WO | 2017089859 A1 | 6/2017 |

OTHER PUBLICATIONS

European Examination Report received in EP Application No. 21213512.3, Nov. 27, 2024, 8 pages.

Shaw et al.: "Helmet-Mounted Display (HMD) Interface Design for Head-Up Display (HUD) Replacement Exploratory Development", AFRL-HE-WP-TR-2002-0168,, Jan. 1, 2002 (Jan. 1, 2002), p. 83 pp, XP008178217.

* cited by examiner

500

FIG. 5A

518 — Automatically discontinuing the displaying of the one or more interactive traffic symbols based on a resolution advisory (RA) issued by a traffic collision avoidance system (TCAS) of the aircraft

FIG. 5A

520 — Detecting at least one of a data loss and a data fault associated with the traffic information 522 — Removing the at least one interactive traffic symbol associated with the data loss or the data fault

FIG. 5E

METHOD FOR INTERACTIVE HEADS-UP DISPLAY AND CONTROL OF TRAFFIC TARGETS

CROSS-REFERENCE TO RELATED APPLICATIONS

This application is related to, and incorporates by reference in its entirety, the following U.S. patent applications:

Concurrently filed U.S. patent Application Ser. No. 17,116,470, entitled HEADS-UP USER INTERFACE AND CONTROLS FOR INTERACTIVE HEADS-UP DISPLAY AND CONTROL OF TRAFFIC TARGETS and which application issued Jun. 21, 2022 as U.S. Pat. No. 11,366,327; and Concurrently filed U.S. patent Application Ser. No. 17.116.541, entitled HEADS-UP USER INTERFACE AND VOICE ACTIVATED CONTROLS FOR DISPLAY OF TRAFFIC TARGETS.

BACKGROUND

Avionic devices that provide a cockpit display of traffic information (CDTI) capability will enable pilots to supplement traffic reports and communications from air traffic control (ATC) and proactively maintain separation from proximate aircraft. For example, CDTI may provide visual representations of a traffic environment, identifying proximate aircraft (e.g., along with the relative positions and/or intent of said aircraft).

CDTI is conventionally displayed in navigation-map format (e.g., overhead view) on a heads-down display (HDD). As a result, when using CDTI or related traffic applications (e.g., CDTI Assisted Visual Separation (CAVS)), the pilot must go heads-down to confirm the location of a traffic target (or, e.g., to designate the target for traffic applications). Conventional systems that incorporate a heads-up display (HUD) generally do not display traffic information via the HUD to reduce visual clutter.

SUMMARY

A method for interactive display of traffic targets via a heads-up display (HUD) is disclosed. In embodiments, the method includes receiving, via an aircraft-based traffic or surveillance system (e.g., TCAS, ADS-B), traffic information from proximate aircraft within a threshold range (including proximate aircraft within the field of view (FOV) of the HUD and "parked" aircraft within range but outside the FOV, e.g. behind the aircraft). The method includes organizing the reporting proximate aircraft into an ordered sequence, based on distance from the ownship or other desired priority criteria. The method includes displaying, via the HUD, interactive traffic symbols for each reporting proximate aircraft and indicating a status of said aircraft. The method includes sequentially highlighting each interactive symbol with a cursor by traversing the ordered sequence in order of priority. The method includes selecting highlighted aircraft via the HUD. The method includes designating, via the HUD, selected aircraft for one or more available spacing or traffic applications.

In some embodiments, the method includes displaying a first type of interactive symbol (e.g., solid-line) for each proximate aircraft within the FOV of the HUD, and displaying a second type of interactive symbol (e.g., broken-line) for each "parked" proximate aircraft outside the FOV of the HUD.

In some embodiments, the method includes displaying the interactive symbols for "parked" aircraft at an edge of the HUD based on the relative position of the corresponding "parked" aircraft.

In some embodiments, the method includes displaying a unique identifier (e.g., tail number) next to the interactive symbol for each proximate aircraft.

In some embodiments, the method includes displaying additional received or derived traffic information next to the interactive symbol for each selected or designated aircraft.

In some embodiments, the method includes displaying the additional traffic information via a cycling or otherwise dynamic text display.

In some embodiments, the additional traffic information is selected from a group including relative position information (e.g., distance/spacing), airspeed information, and trajectory information (e.g., climbing/descending) of the proximate aircraft.

In some embodiments, the method includes displaying some interactive symbols with greater relative prominence (e.g., larger, brighter) based on a higher priority of the associated proximate aircraft with respect to the ordered sequence (e.g., closer to the ownship).

In some embodiments, the method includes displaying some interactive symbols with reduced relative prominence (e.g., smaller, dimmer) based on a lower priority of the associated proximate aircraft with respect to the ordered sequence (e.g., more distant from the ownship).

In some embodiments, the method includes superimposing the interactive symbols over other visual content displayed by the HUD.

In some embodiments, the method includes automatically discontinuing the display of the interactive traffic symbols based on a detected unusual attitude of the aircraft.

In some embodiments, the method includes automatically discontinuing the display of the interactive traffic symbols based on a resolution advisory (RA) issued by a traffic collision avoidance system (TCAS) of the aircraft.

In some embodiments, the method includes manually discontinuing the displaying of the one or more interactive traffic symbols. In some embodiments, the method includes detecting lost or invalid position or traffic information. The method includes removing from the HUD traffic overlay any interactive symbols for any proximate aircraft associated with lost, inaccurate, or invalid position and traffic information.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIGS. 5A through 5E are flow diagrams illustrating a method for interactive display of traffic targets via a HUD according to example embodiments of this disclosure;

DETAILED DESCRIPTION

Figure 1:
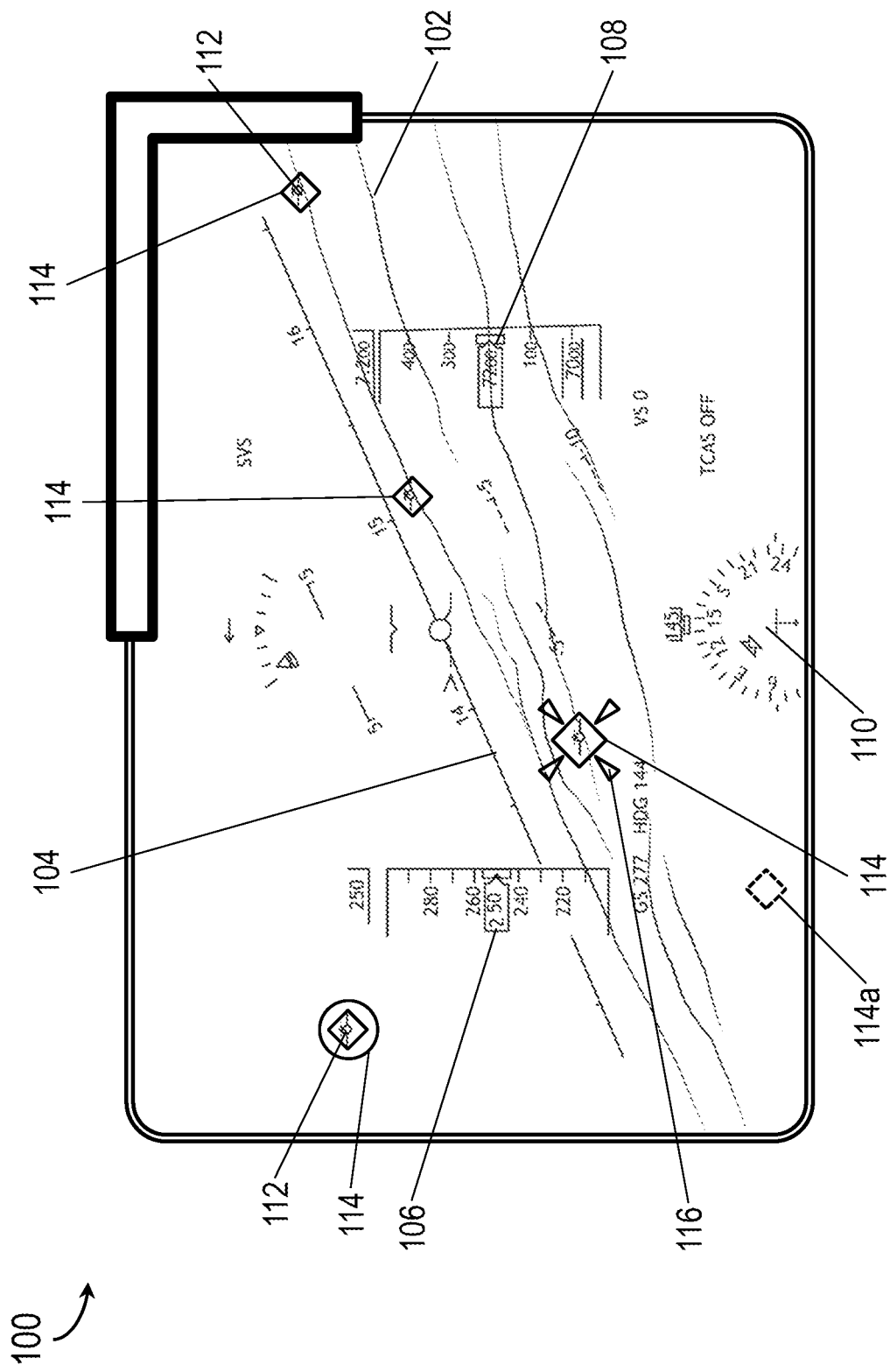
FIG. 1 is an illustration of an interactive heads-up display (HUD according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a heads-up display (HUD) and user interface incorporating interactive heads-up display and control of traffic targets. For example, traffic information may be displayed via the HUD in conformance to actual proximate traffic, and interactive controls allow the pilot to directly manage traffic targets through the HUD while eyes-out, eliminating the need to cycle back and forth with heads-down traffic displays and enhancing general situational awareness.

Referring to FIG. 1, a heads-up display 100 (HUD) incorporating heads-up interactive traffic overlay is disclosed.

In embodiments, the HUD 100 may include a fixed transparent display positioned in a line of sight between the eyes/head of the pilot/co-pilot and a forward cockpit window. In some embodiments, the HUD 100 may include head-worn or helmet-mounted displays (HWD, HMD) worn by a pilot/co-pilot or operator of the aircraft and presenting a dynamic view based on the orientation of the pilot's head relative to the aircraft. In some embodiments the HUD 100 may include one or more synthetic display feeds corresponding to a field of view (FOV). For example, the FOV may be a static FOV fixed relative to the aircraft (e.g., in the case of a HUD fixed in front of an aircraft window), and corresponding to the display size, e.g., X degrees horizontal by Y degrees vertical. Alternatively, the FOV may be a dynamic FOV, e.g., the FOV of HMD/HWD systems may be fixed to the position and orientation (e.g., pose) of the head of the pilot or operator, and may shift as the head moves.

In embodiments, the HUD 100 may incorporate Synthetic Vision Systems (SVS), Enhanced Vision Systems (EVS), Combined Vision Systems (CVS), and other like means of visually representing the environment proximate to the aircraft. For example, Combined Vision displays may include real-time camera feeds (e.g., visible light and/or infrared) of the terrain 102 over which the aircraft is in flight, enhanced by terrain data or other supplementary information. The HUD 100 may include a primary flight display (PFD) or selected PFD instruments or components, e.g., artificial horizon 104, airspeed indicator 106, altimeter 108, heading indicator 110.

In some embodiments, the HUD 100 may include proximate air traffic 112. For example, proximate air traffic 112 may include any commercial or civil aircraft close enough to the ownship for visual identification (e.g., and any unmanned aircraft close enough, or large enough, for visual identification). For example, while the pilot may be able to confirm the presence of proximate air traffic 112, e.g., via visual identification, the pilot may not be able to confirm the unique identities of each proximate aircraft 112 via visual identification alone. Accordingly, conventional methods may require the pilot to alternate between a HUD and a heads-down Cockpit Display of Traffic Information (CDTI) or other traffic display in order to match each visually identified proximate aircraft to a traffic target displayed via CDTI.

In embodiments, the HUD 100 may receive CDTI traffic information and generate a HUD traffic overlay comprising interactive symbols matched to each proximate aircraft 112 according to its relative position, e.g., where the proximate aircraft would appear as viewed through the transparent display surface. For example, the aircraft may be equipped with collision avoidance (e.g., aircraft collision avoidance systems, traffic collision avoidance systems (ACAS, TCAS)) and/or surveillance radar systems (including, but not limited to, automatic dependent surveillance-broadcast (ADS-B) or other sensor-based systems capable of receiving encoded messages from ground-based air traffic control facilities or directly from proximate aircraft. Traffic information may include identifying information (e.g., tail numbers or other unique identifiers) and position information (e.g., latitude, longitude, altitude) of any adequately configured aircraft in range. Traffic information may include unmanned aircraft systems (UAS) if said UAS are configured with the proper equipment for ownship position determination and ADS-B information. In embodiments, the HUD 100 traffic overlay may be superimposed over other visual content presented by the HUD (e.g., SVS/EVS/CVS feeds), or the HUD traffic overlay may be displayed independent of any other visual content.

In embodiments, all aircraft corresponding to a position and identifier received by the HUD 100 may be displayed by the HUD as interactive symbology 114 corresponding to the decoded position information. For example, all identified aircraft within a threshold range and within the field of view of the HUD 100 may be represented by interactive symbology 114 based on the relative position of the identified aircraft to the ownship position of the embodying aircraft, e.g., as determined by onboard global navigation satellite system (GNSS)-based or other like position receivers.

In embodiments, the interactive symbology 114 of the traffic overlay system of the HUD 100 may indicate not only the relative position of all proximate aircraft 112 but also a status of each proximate aircraft relative to the HUD traffic overlay system. For example, the interactive symbology 114 may additionally indicate if a proximate aircraft 112 is currently highlighted by the HUD 100 (e.g., via a cursor 116), selected by the HUD, or designated by the HUD (e.g., as an "othership") for CDTI assisted visual separation (CAVS), Flight Deck Interval Management (FIM), and/or other like approach spacing or traffic applications. In some embodiments, traffic information may include proximate aircraft 112 whose positions are within range of the HUD 100 traffic overlay system but whose positions relative to the ownship position are outside the field of view of the HUD 100. Interactive symbology 114a may indicate such "parked" aircraft whose relative positions are outside the field of view, e.g., behind the aircraft (or behind the current orientation of the pilot, for HMD/HWD implementations). For example, "parked" aircraft may be represented by interactive symbology 114a incorporating broken or dotted lines and positioned along an edge of the FOV of the HUD 100 corresponding to the relative position of the "parked" aircraft (e.g., at an approximately 7 o'clock bearing relative to the ownship).

In embodiments, the HUD 100 may display each interactive symbol 114, 114a such that the center of the displayed symbol corresponds with the reported position and altitude data of the corresponding proximate aircraft 112. For example, if received position and altitude data is not within predetermined accuracy tolerances, interactive symbology may not be displayed. In some embodiments, the size of a displayed symbol may be fixed or may be dynamic based on one or more preselected factors, e.g., distance/range and/or position accuracy/uncertainty.

In embodiments, the HUD 100 may include an interactive heads-up control system allowing the pilot to manage traffic target display and applications without looking away from the HUD. For example, the heads-up controls allow the pilot to toggle HUD 100 traffic overlay between active and inactive status (e.g., "on" or "off") and cycle/traverse a cursor through each identified proximate aircraft 112 in sequence. All proximate aircraft 112 may be organized into an ordered sequence or hierarchy by the HUD 100 based on one or more criteria selected by the pilot; for example, sequence criteria may be preset in advance or modified via the heads-up control, as disclosed in greater detail below. The interactive symbols 114 corresponding to each proximate aircraft 112 may vary to indicate the current status of each proximate aircraft with respect to the HUD 100 traffic overlay and with respect to CAVS and other traffic applications, including (but not limited to): normal; highlighted (e.g., a proximate aircraft currently highlighted by the cursor 116, but which the pilot has not selected or designated); selected (e.g., a proximate aircraft which the pilot has selected for possible traffic applications; may be highlighted or non-highlighted, e.g., the cursor has been moved or has timed out); designated (e.g., designated by the pilot for CAVS or another traffic application).

Figure 2A:
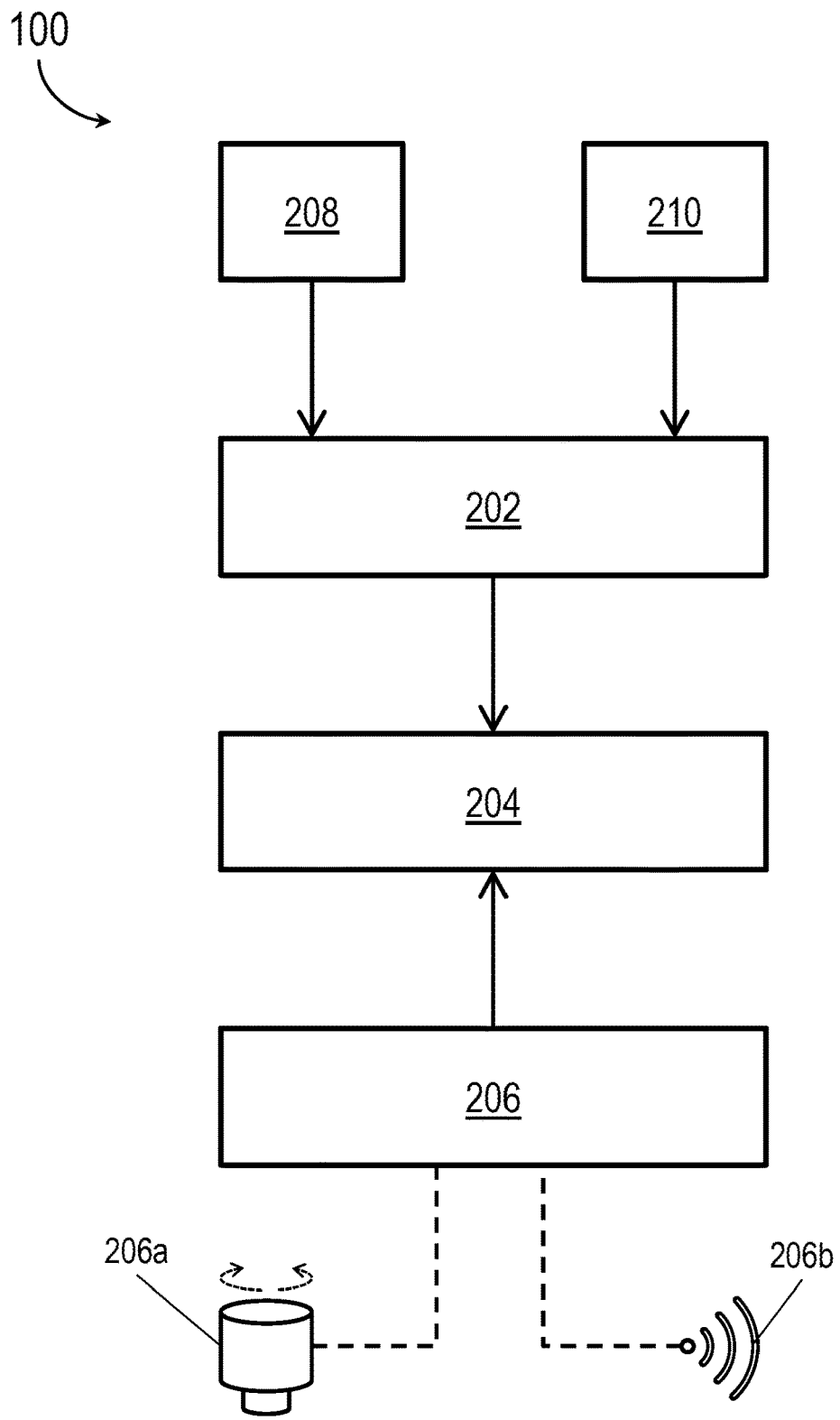
FIG. 2A is a block diagram of the interactive HUD of FIG. 1.
Figure 2B:
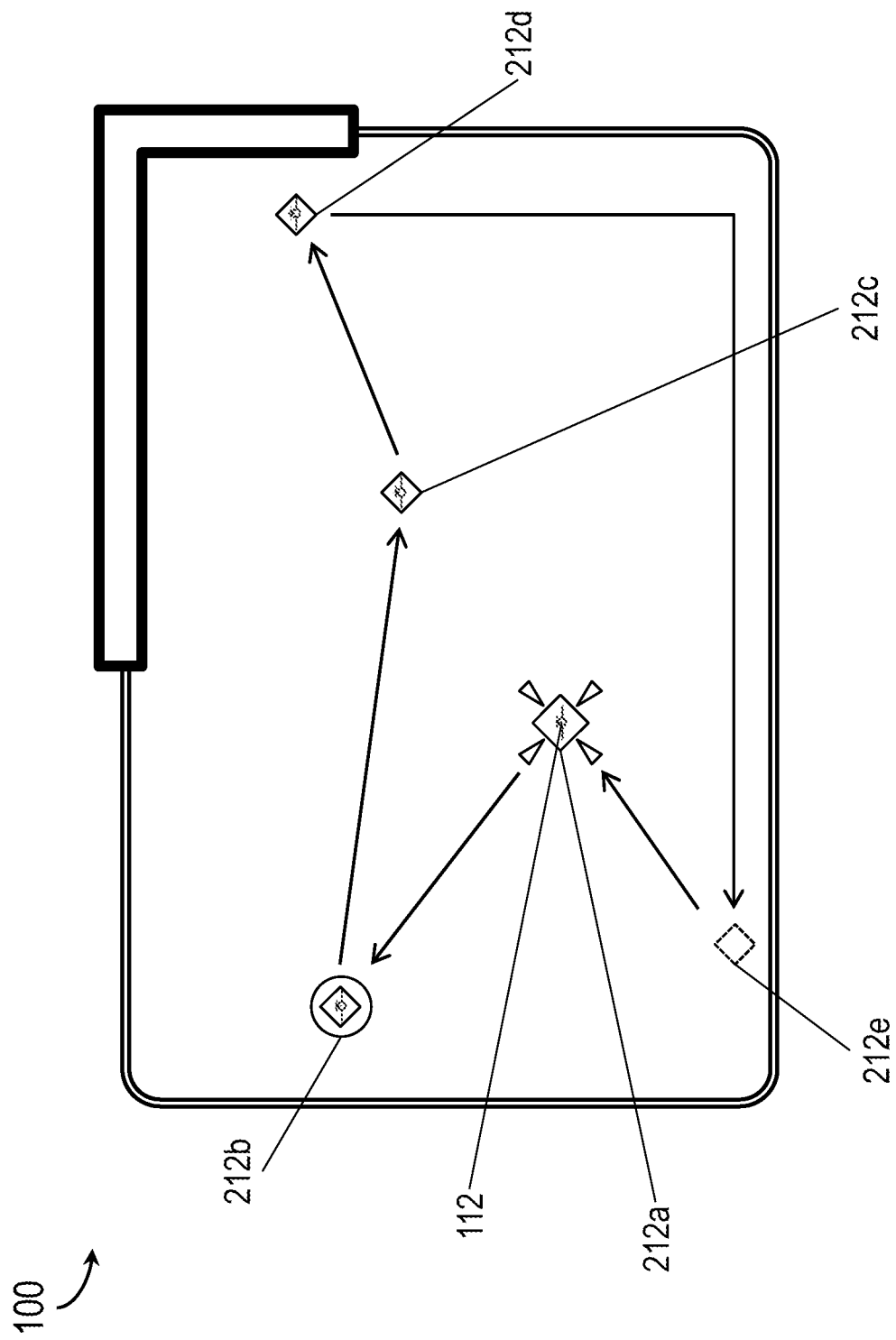
FIG. 2B illustrates operations of the interactive HUD of FIG. 1.

Referring now to FIGS. 2A and 2B, the HUD 100 traffic overlay system is disclosed. The HUD 100 may include control processors 202, heads-up display components 204 (e.g., including graphics processors and display surfaces), and heads-up controller 206.

In embodiments, the control processors 202 may receive traffic information from traffic collision avoidance systems 208 (TCAS), ADS-B In receivers 210, and other like collision avoidance and/or traffic monitoring systems. For example, traffic information may include unique identifiers (e.g., tail numbers, ICAO identifiers) and position information (latitude, longitude, altitude) corresponding to proximate aircraft (112, FIG. 1). Based on received traffic information, the control processors 202 may display interactive symbology 212a-e corresponding to the positions of reporting proximate aircraft 112 (or, e.g., superimpose interactive symbology over the synthetic display imagery (e.g., EVS, SVS)), as shown by FIG. 2B. (See also, e.g., FIG. 1, 114/114a.)

Referring also to FIG. 2B, in embodiments the HUD 100 traffic overlay may arrange and/or modify interactive symbology 212a-e based on one or more criteria (e.g., horizontal distance from ownship, angular displacement from boresight) selectable by the pilot and modifiable via the heads-up controller 206. For example, the control processors 202 may determine that the position of the proximate aircraft corresponding to the interactive symbol 212a is closest to the ownship position, and that therefore the interactive symbol 212a is to be placed first in the ordered sequence of interactive symbols 212a-d. In some embodiments, the interactive symbol 212a may also be displayed with increased or reduced prominence (e.g., greater or lesser brightness, increased or decreased size, change in color) relative to other interactive symbols to reflect the proximity of the corresponding aircraft 112 (e.g., or more generally the priority of the corresponding aircraft with respect to the ordered sequence of aircraft reporting position information). Similarly, the pilot may (e.g., via the heads-up controller 206, advance in turn through the interactive symbols 212b-d corresponding to more distant aircraft 112 (e.g., but still within the FOV of the HUD 100), and then to the interactive symbol 212e corresponding to a "parked" aircraft behind the ownship and/or its pilot (and thereby represented by a dashed symbol positioned at an edge of the FOV of the HUD 100 and corresponding to the relative position of the "parked" aircraft).

In some embodiments, the control processors 202 may be in communication with attitude sensors or other aircraft sensors. For example, if an unusual attitude of the aircraft is detected, the HUD 100 may automatically discontinue interactive symbology 212a-e to reduce clutter within the HUD (which may distract the pilot from resolving the unusual attitude). Similarly, the TCAS 208 may issue a resolution advisory (RA) to the pilot or flight crew (e.g., recommending maneuvers and/or maneuver restrictions to either achieve or maintain separation from a threat). In some embodiments, the HUD 100 may automatically discontinue interactive symbology 114, 212a-e in the event of an RA issued by the TCAS 208. In some embodiments, the HUD 100 may remove one or more interactive symbols 212a-e in the event of a data loss or data fault with respect to the position information reported by the corresponding proximate aircraft 112. For example, if a proximate aircraft 112 ceases transmitting position information, or the transmission is not received, or position information is not within a desired accuracy tolerance, the corresponding interactive symbol 212a-e may be removed from the HUD 100 traffic overlay until accurate position information is once again received.

Figure 3:
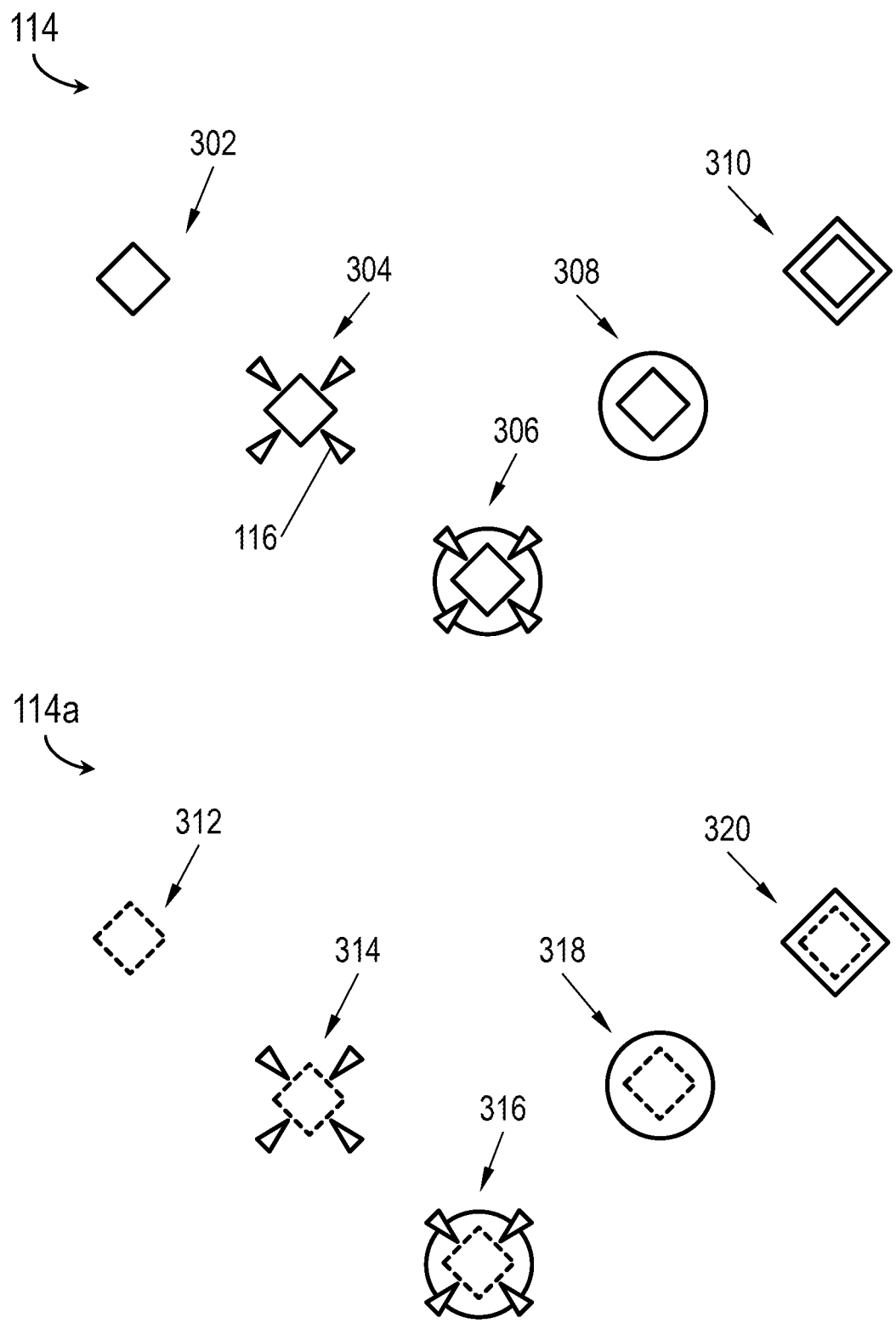
FIG. 3 is an illustration of example symbology of the interactive HUD of FIG. 1.

Referring now to FIG. 3, the interactive symbology 114, 114a of the HUD traffic 100 overlay of FIG. 1 is disclosed.

In embodiments, the interactive symbology 114 may indicate a status (e.g., with respect to CDTI and any applicable traffic applications) of each proximate aircraft (112, FIG. 1) for which the HUD 100 has traffic information (e.g., an identifier and position). For example, the symbol 302 may indicate a proximate aircraft 112 having normal status, e.g., any aircraft within the threshold range, within the field of view, and not otherwise highlighted, selected, or designated. The symbol 304 may indicate a proximate aircraft 112 having normal status (e.g., neither selected nor designated) but which is currently highlighted by the HUD 100 traffic overlay cursor 116. The symbol 306 may indicate a proximate aircraft 112 selected by the HUD 100 traffic overlay and which is still highlighted by the cursor 116. For example, the pilot (e.g., via the heads-up controller 206) may select a traffic target for display of additional received or derived traffic information (as disclosed in greater detail below) but without designating the traffic for CAVS or other like applications. Similarly, the symbol 308 may indicate a proximate aircraft 112 selected but no longer highlighted by the cursor 116. The symbol 310 may indicate a proximate aircraft 112 designated for CAVS by the pilot. For example, when a traffic target is selected (306), the HUD 100 traffic overlay may display a menu of traffic applications from which the pilot may select a specific application for which the corresponding proximate aircraft will be designated as "othership". The proximate aircraft may shift status from selected/highlighted (306) to designated (310), as the cursor 116 is removed upon designation.

In embodiments, the interactive symbology 114a, e.g., the interactive symbols 312, 314, 316, 318, 320, may be implemented and may function similarly to the interactive symbols 302, 304, 306, 308, 310, except that the interactive symbols 312, 314, 316, 318, 320 may indicate "parked" aircraft having, respectively, a normal status (312); highlighted/deselected status (314); highlighted/selected status (316); selected/non-highlighted status (318); and designated status (320). For example, the interactive symbols 312, 314, 316, 318, 320 may be displayed by the HUD 100 traffic overlay similarly to the interactive symbols 302, 304, 306, 308, 310, except that the interactive symbols 312, 314, 316, 318, 320 may be fully or partially rendered in dashed or broken lines.

In some embodiments, the heads-up controller 206 may include a control knob or other like heads-up manual controller 206a manually operable by the pilot/co-pilot without looking away from, or otherwise taking their focus off, the HUD 100. In some embodiments, the heads-up controller 206 may include a voice-activated command system 206b; for example, the pilot may manually trigger the voice-activated command system to listen for and decode verbal command input and perform HUD 100 traffic overlay functions based on the decoded command input. Heads-up controller systems 206a-b are disclosed in greater detail below. In embodiments, the interactive symbology 114, 114a is not limited to the symbols described above, but may include other symbols and combinations of symbols configured to convey the same information.

Figure 4:
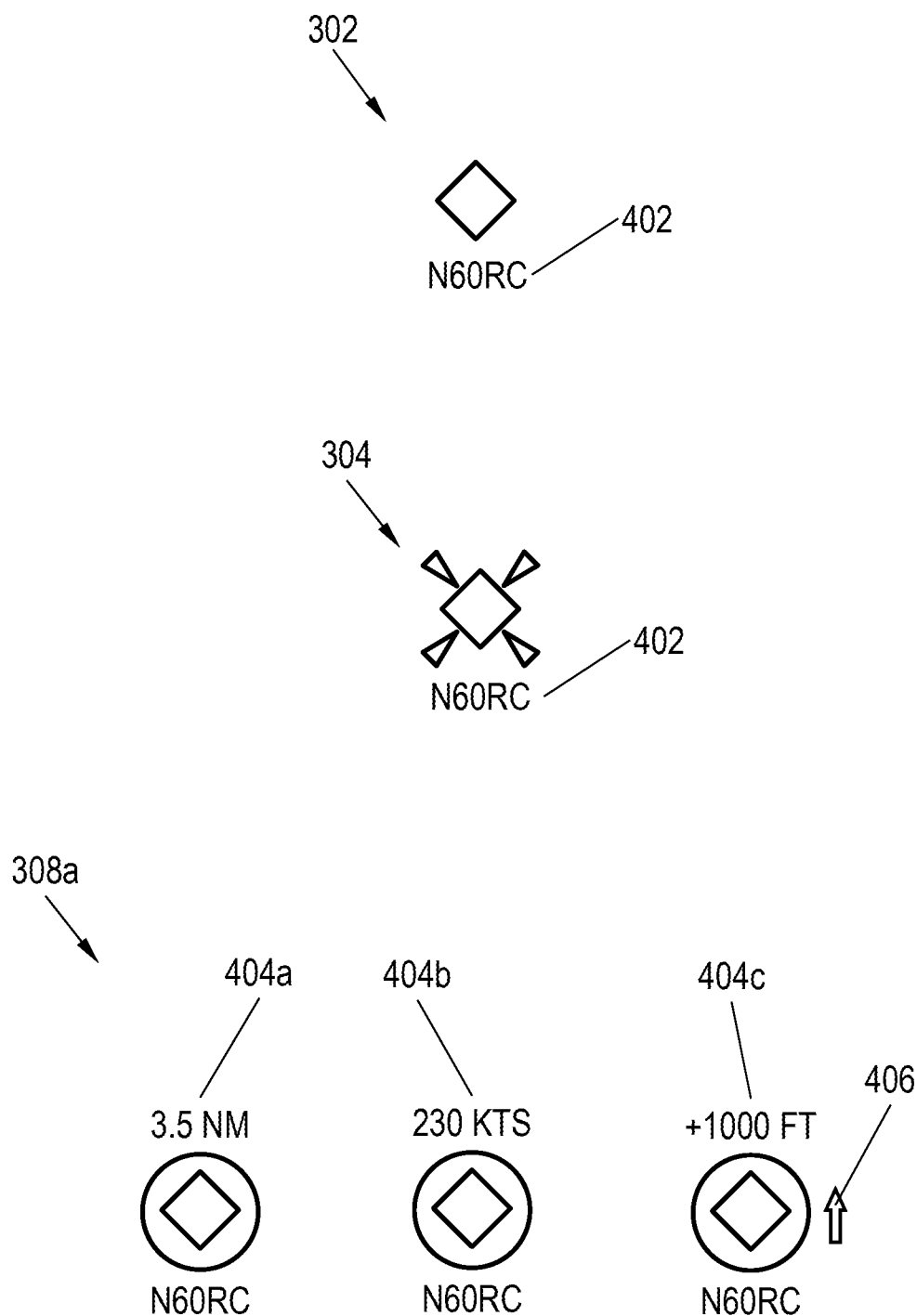
FIG. 4 is an illustration of example symbology of the interactive HUD of FIG. 1.

Referring to FIG. 4, in embodiments, the HUD (100, FIG. 1) traffic overlay may augment interactive symbology (114/114a, FIG. 3) by displaying additional information corresponding to the proximate aircraft (112, FIG. 1) associated with a displayed interactive symbol. For example, the interactive symbols 302 and 304 may correspond to a proximate aircraft 112 having tail number N60RC (e.g., or some other unique identifier corresponding to the particular aircraft), which information may be obtained by the HUD 100 traffic overlay by decoding inbound position messages received by a TCAS or ADS-B receiver (208, 210; FIG. 2). The tail number or identifier (402) may be displayed directly below the corresponding interactive symbols 302, 304 to aid in visual confirmation of the specific and correct traffic target.

In embodiments, the interactive symbol 308a may be implemented and may function similarly to the interactive symbol 308 of FIG. 3, except that for selected and/or designated traffic targets (e.g., also including selected/highlighted traffic targets (306, FIG. 3) and designated traffic targets (310, FIG. 3)), the HUD 100 traffic overlay may display additional textual information and/or graphic information. For example, the control processors (202, FIG. 2) may derive additional pertinent information about specific proximate aircraft (112, FIG. 1) based on position information received from the proximate aircraft (or, e.g., based on trends observed within multiple position reports over time from the same traffic target). For example, the HUD 100 traffic overlay may display textual traffic information as a single-line display cycling between multiple data points (e.g., distance to the traffic target, relative to the ownship position ("3.5 NM", 404a); traffic speed (absolute or relative) ("230 KTS", 404b); traffic spacing/interval distance for a set time interval (e.g., 2 seconds per data point); category (e.g., single-engine land, rotorcraft, powered-lift, glider, or other aviation class rating.) Further, the HUD 100 traffic overlay may display relative altitude (e.g., of the traffic target relative to the ownship; plus signs (+) indicate altitude above and minus signs (−−) indicate altitude below) ("+1000 FT", 404c). The HUD 100 traffic overlay display may further include an upward-pointing climb arrow (406) or downward-pointing descent arrow based on whether the proximate aircraft 112 is climbing or descending.

Figure 5A:
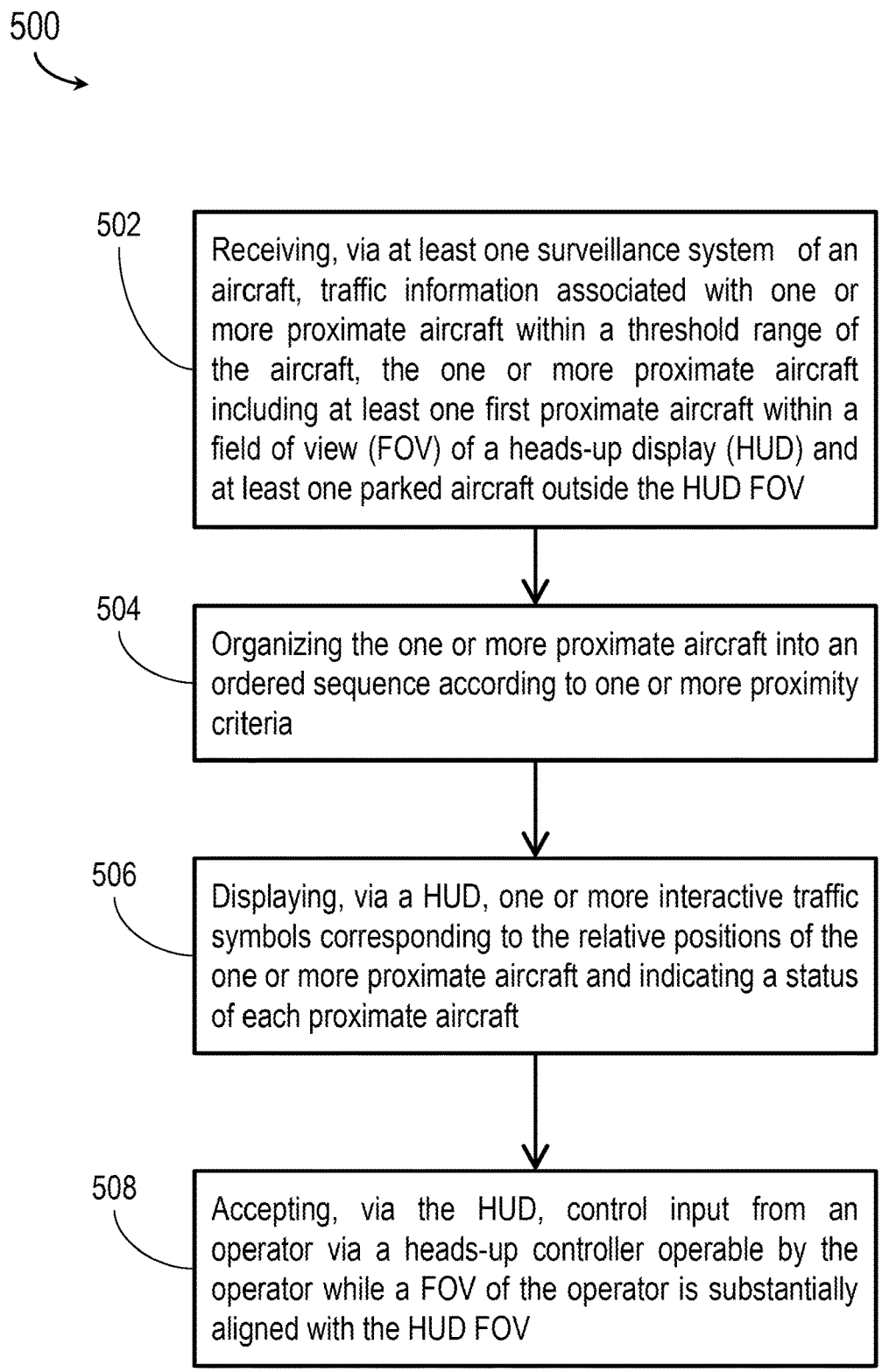

Referring to FIG. 5A, the method 500 may be implemented by the HUD 100 and may include the following steps.

At a step 502, the HUD receives traffic information associated with one or more proximate aircraft within a threshold range of the aircraft. For example, the traffic information may be received and decoded by onboard collision avoidance and/or surveillance systems (e.g., traffic collision avoidance system (TCAS), automatic dependent surveillance-broadcast (ADS-B) receiver). In some embodiments, the traffic information may include aircraft within the field of view (FOV) of the HUD as well as aircraft within the threshold range but outside the FOV.

At a step 504, the HUD traffic overlay organizes and arranges all proximate aircraft (e.g., all proximate aircraft for which traffic information has been received) into an ordered sequence according to one or more selectable proximity criteria, e.g., distance from the ownship (horizontal and/or vertical).

At a step 506, the HUD displays interactive symbols over each proximate aircraft within the threshold range and associated with received traffic information. For example, the interactive symbols may indicate the status of the proximate aircraft relative to the HUD (e.g., default/normal; highlighted; selected; designated for traffic applications). In some embodiments, interactive symbols may be displayed at increased or reduced prominence (e.g., greater or lesser brightness, greater or lesser size) to indicate higher or lower priority within the ordered sequence, e.g., closer aircraft may be associated with larger/brighter symbols and more distant aircraft with smaller/dimmer symbols. In some embodiments, interactive symbols for proximate aircraft may include tail numbers or other unique aircraft identifiers. In some embodiments, interactive symbols for selected and designated aircraft may additionally include other received or derived traffic information, e.g., a distance or airspeed of the proximate aircraft; whether the proximate aircraft is above or below the ownship and whether it is climbing or descending. The HUD may display the interactive symbols independently or superimposed over other displayed visual feeds, e.g., SVS/EVS/CVS.

At a step 508, the HUD traffic overlay accepts control input from a pilot/co-pilot, operator, or user via a heads-up controller. For example, the heads-up controller may include a control knob operable by the pilot while focused on the HUD, or a voice-activated controller.

Figure 5B:
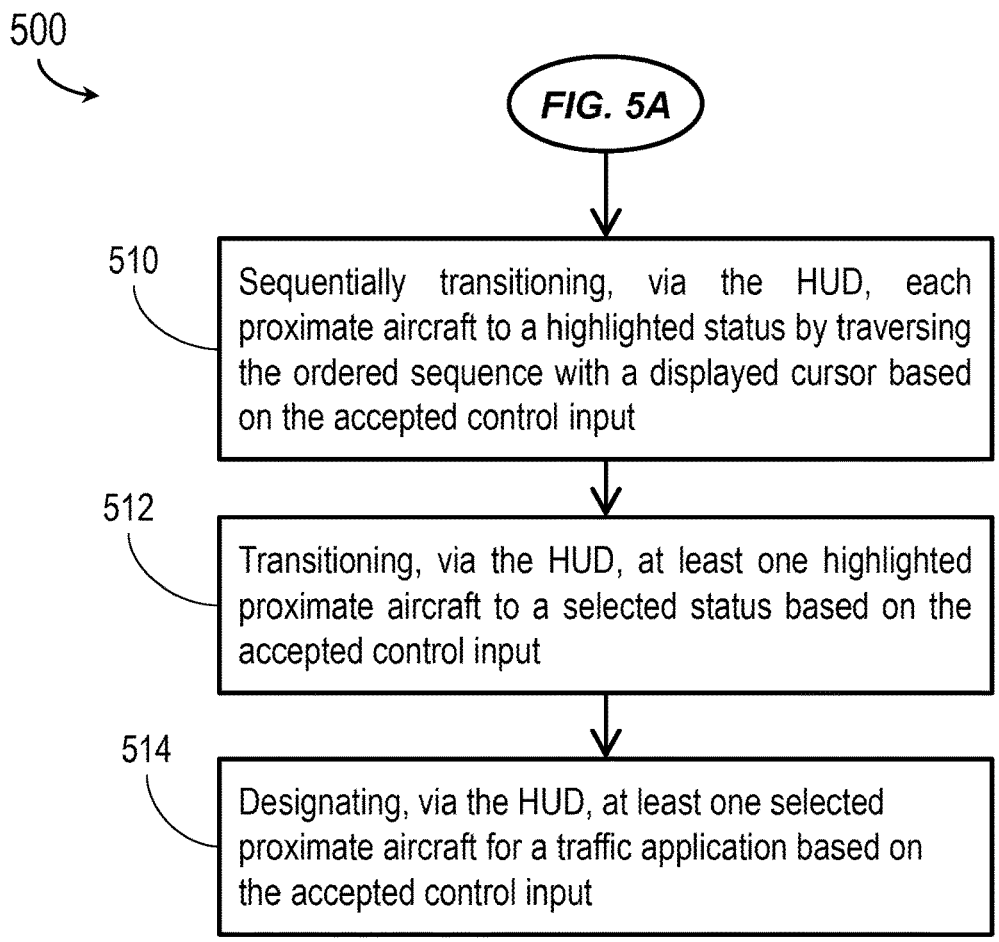

Referring now to FIG. 5B, a step 510, the HUD traffic overlay may transition, in turn, each interactive symbol corresponding to a proximate aircraft from a non-highlighted to a highlighted status by traversing the ordered sequence based on the received control input. For example, the HUD traffic overlay may highlight with a cursor each interactive symbol in turn as directed by the user in decreasing order of distance or priority (or, e.g., based on other selectable priority criteria). In some embodiments, the HUD traffic overlay may display, next to any interactive symbol corresponding to a proximate aircraft having a normal/default status (highlighted or unhighlighted), a tail number or other unique identifier of the aircraft.

At a step 512, the HUD traffic overlay transitions a cursor-highlighted interactive symbol (e.g., and its corresponding aircraft) to a selected status based on the accepted control input. For example, when a proximate aircraft is selected by the HUD traffic overlay, the traffic overlay may display additional content associated with, e.g., the relative position, airspeed, spacing, category, and/or trajectory of the proximate aircraft.

At a step 514, the HUD traffic overlay designates a selected proximate aircraft for one or more traffic applications (e.g., as an "othership" for CAVS or spacing purposes) based on the accepted control input (e.g., and adjusting the corresponding interactive symbol accordingly). For example, the cursor may be removed from the displayed designated-aircraft symbol.

Figure 5C:
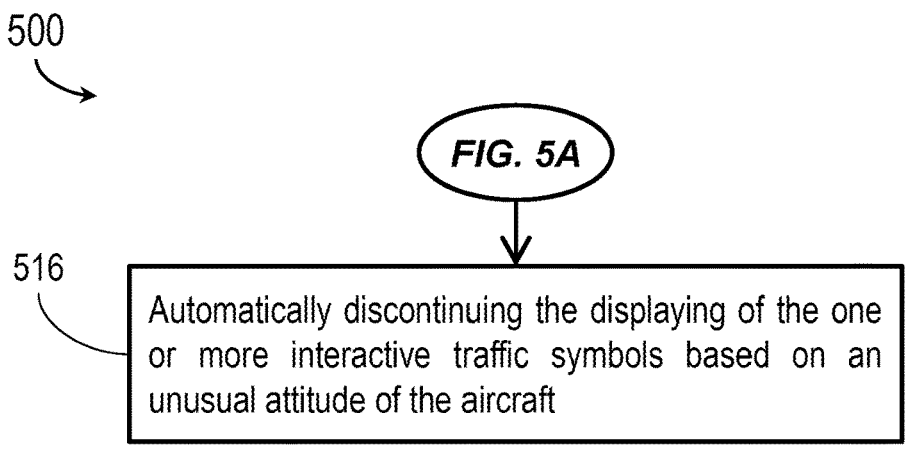

Referring now to FIG. 5C, the method 500 may include an additional step 516. At the step 516, the HUD may automatically discontinue the traffic overlay to reduce clutter if an unusual attitude of the ownship is detected (e.g., via onboard attitude sensors).

Referring now to FIG. 5D, the method 500 may include an additional step 518. At the step 518, the HUD may automatically discontinue the traffic overlay to reduce clutter. if the onboard TCAS issues a resolution advisory (RA).

Referring now to FIG. 5E, the method 500 may include additional steps 520 and 522. At the step 520, the HUD may detect a data loss or data fault with respect to received position information. For example, position information transmissions from one or more proximate aircraft may not be received, or the received position information may be invalid, e.g., outside prescribed accuracy or data integrity limits.

At the step 522, the HUD removes the interactive symbols for any proximate aircraft associated with lost, invalid, or otherwise faulty position information.

Figure 6A:
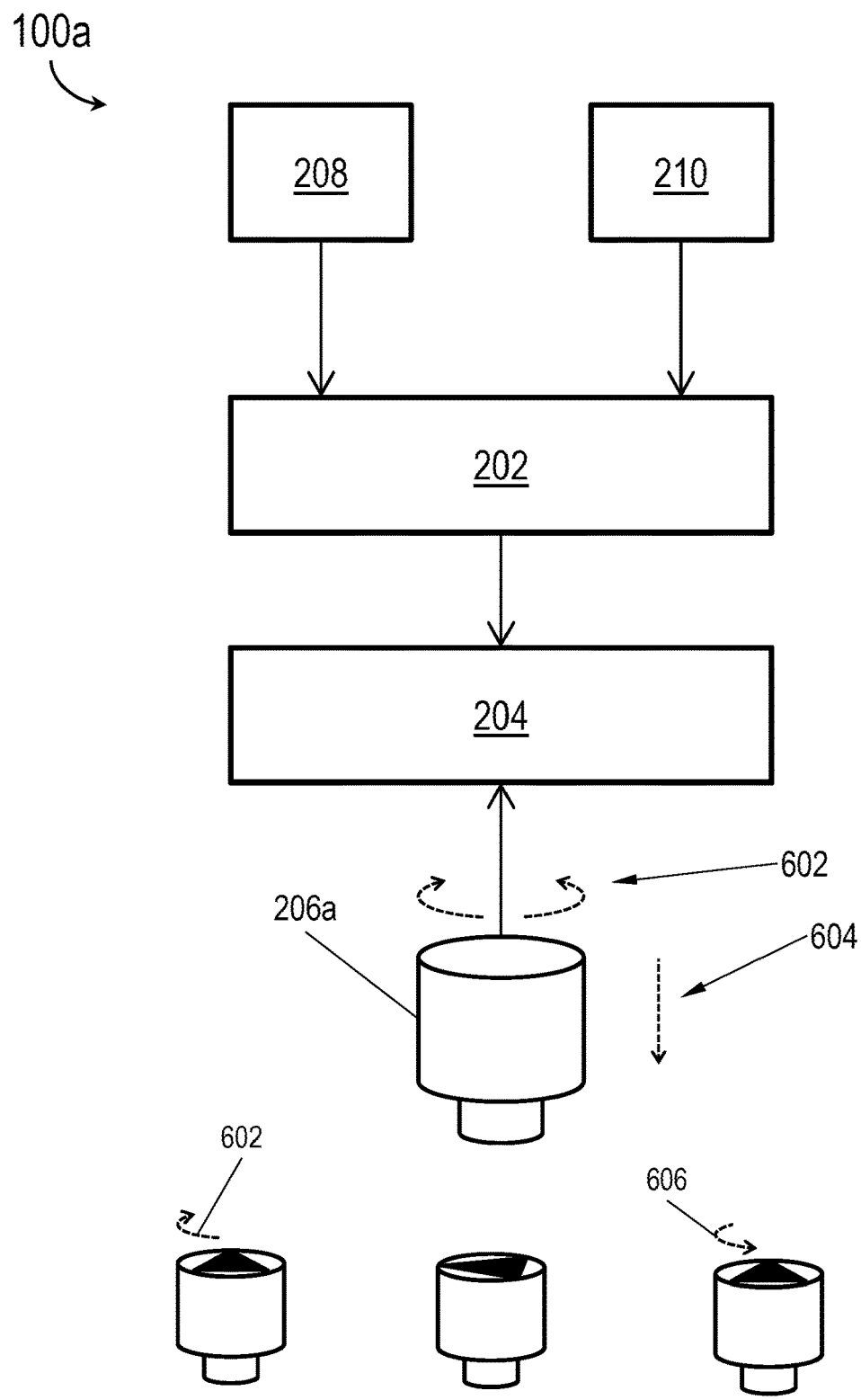
FIG. 6A is a block diagram of the HUD of FIG. 1 incorporating a heads-up manual control system.

Referring to FIG. 6A, the HUD 100a may be implemented and may function similarly to the HUD 100 of FIGS. 1 through 4, except that the HUD 100a may incorporate a heads-up manual control knob 206a.

In embodiments, the heads-up manual control knob 206a may be configured for controlled rotation 602 and downward articulation 604 (e.g., press-and-release). For example, controlled rotation 602 may involve rotating (e.g., tabbing) the heads-up control knob 206a in a partial arc, either clockwise or counterclockwise. The heads-up manual control knob 206a may be spring-loaded or otherwise configured to retract (606) back to its initial position after being rotated 602 in either direction.

Figure 6B:
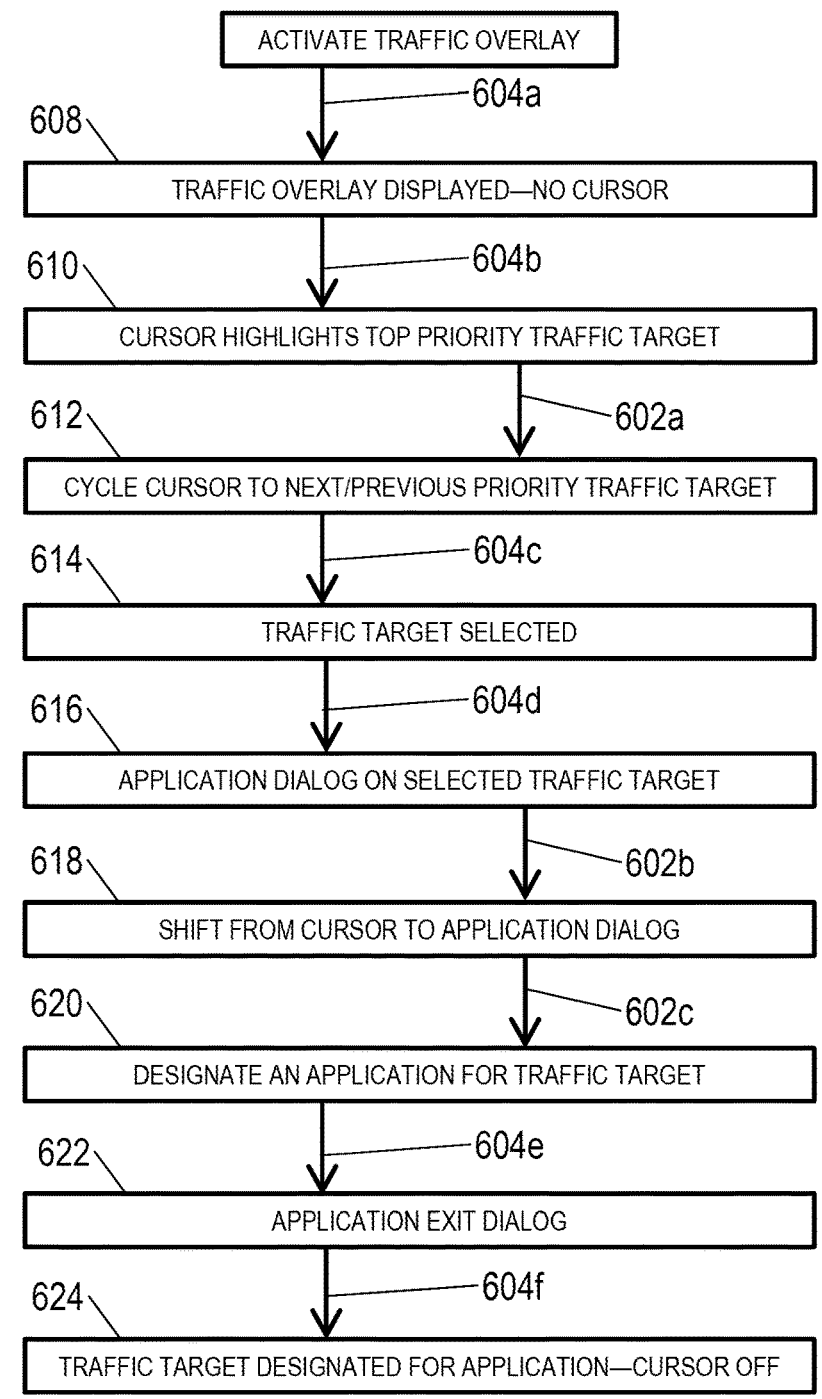
FIG. 6B is a diagrammatic illustration of example operations of the HUD of FIG. 6A.

Referring also to FIG. 6B, example operations of the heads-up manual control knob 206a and the HUD 100a are disclosed. In embodiments, the heads-up manual control knob 206a may incorporate combinations of controlled rotation 602 and downward articulation 604 to allow the pilot/co-pilot to convey control input to the HUD 100a without looking away from, or otherwise shifting focus from, the HUD.

For example, the pilot may press down (604a) to activate the HUD 100a traffic overlay (608; similarly, pressing down may deactivate the HUD traffic overlay if is currently active). The activated traffic overlay may display interactive traffic symbols (114, FIG. 1) for all proximate aircraft (112, FIG. 1) within the threshold range reporting position information. To activate the cursor (116, FIG. 1) the pilot may press down again (604b) to highlight the highest priority traffic target (610, e.g., the proximate aircraft 112 closest to the ownship). To highlight a different traffic target, the pilot may rotate (602a) the heads-up manual control knob 206a counterclockwise or clockwise to sequentially traverse each interactive traffic symbol 114 in ascending or descending sequential order of priority (612).

Once the desired traffic target is highlighted, the pilot may press down (604c) to select the highlighted target (614), and press down once more (604d) to open an application dialog for the selected target (616). By rotating (602b), the pilot may shift control from the cursor 116 to the application dialog (618), and by rotating again (602c) the pilot may scroll through available spacing or traffic applications in the application dialog to designate a specific application (e.g., CAVS) for use with the selected target (620). By pressing down (604e), an application exit dialog may be opened (622), and by pressing down once more (604f), the application dialog is exited and the selected traffic target designated for the desired application (624), whereby the cursor 116 disappears from the now-designated traffic target.

In some embodiments, the heads-up controller 206 may include, but is not limited to: existing flight deck controls; multifunction dual stack knob (DSK); data tabber knob on a cursor control panel (CCP); or multifunction keypad (MKP).

Figure 7A:
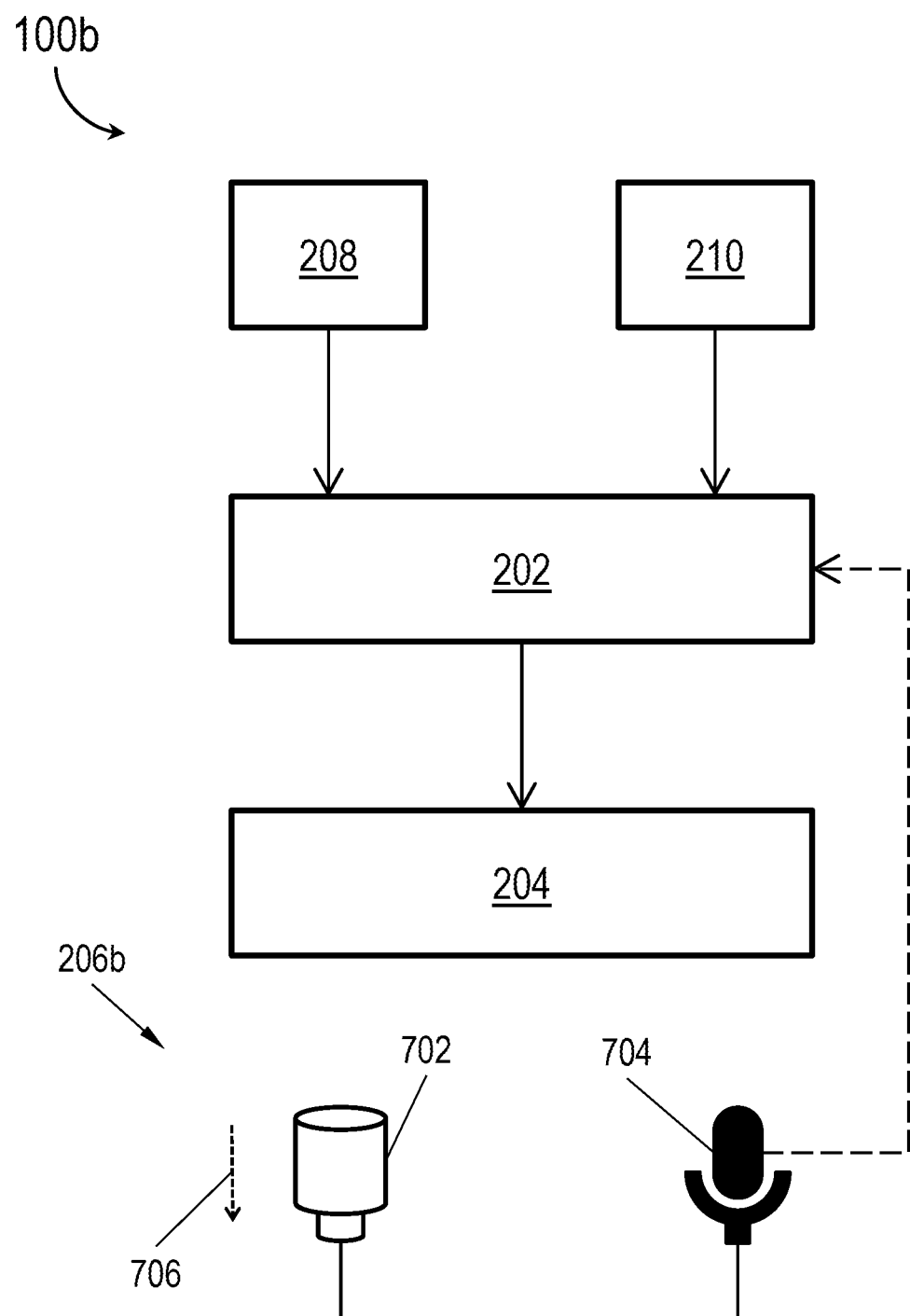
FIG. 7A is a block diagram of the HUD of FIG. 1 or 6A incorporating a heads-up voice-activated command system.

Referring now to FIG. 7A, the HUD 100b may be implemented and may function similarly to the HUDs 100, 100a of FIGS. 1 through 6B, except that the HUD 100b may incorporate a voice-activated command system 206b. The voice-activated command system may include a press-and-release control knob 702 and a microphone 704 for receiving vocal control input from the pilot/co-pilot. In embodiments, the HUD 100b may be embodied in a head-worn or helmet-mounted display (HWD, HMD) system, and the microphone 704 may be similarly head-worn or helmet-mounted.

In embodiments, the voice-activated command system 206b may be used instead of, or in conjunction with, the heads-up manual control knob 206a of FIGS. 6A-B. For example, the HUD 100b may be trained via machine learning techniques to decode or parse vocal control input spoken by the pilot and identify within the decoded control input command instructions (e.g., specific words or phrases recognizable by the HUD and associated with specific executable instructions, operations, or command sequences).

In embodiments, the pilot may hold down (706) the press-and-release control knob 702 to indicate vocal control input spoken into the microphone 704, which vocal control input may be converted into digital signals and analyzed by the control processors 202. For example, the control processors 202 may be trained (e.g., via analysis of the pilot's voice) to identify with sufficient confidence particular words and phrases spoken by the pilot, parsing the words and phrases into executable instructions. When the pilot has finished speaking, releasing the control knob 702 may signal the HUD 100b to cease "listening" via the microphone 704.

Figure 7B:
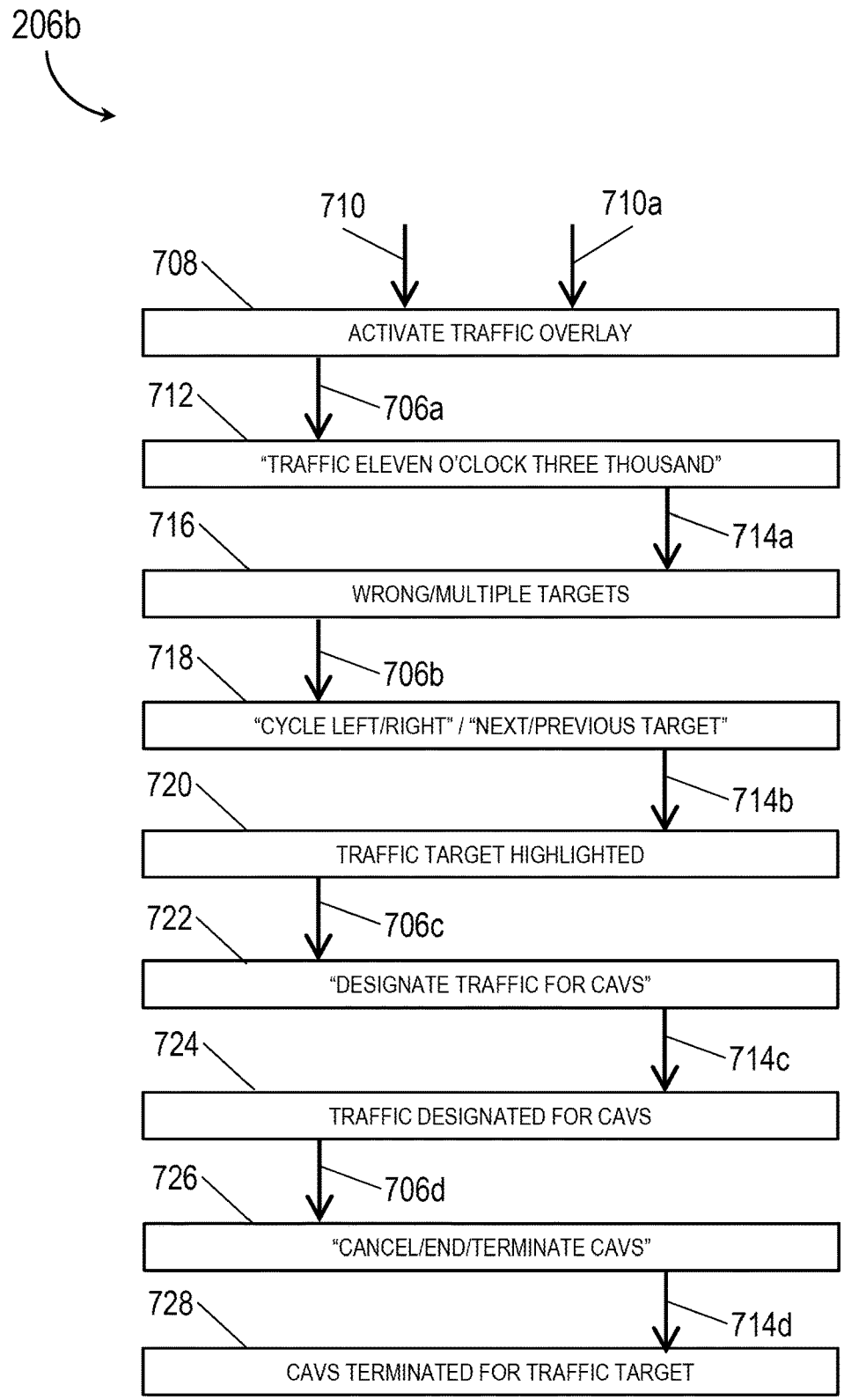
FIGS. 7B through 7D are diagrammatic illustrations of example operations of the HUD of FIG. 7A.
Figure 7C:
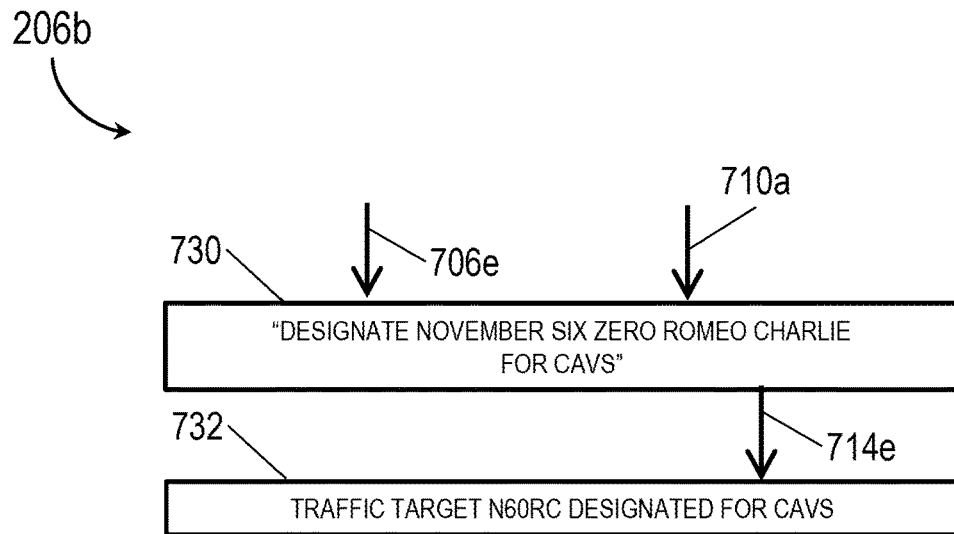
Figure 7D:
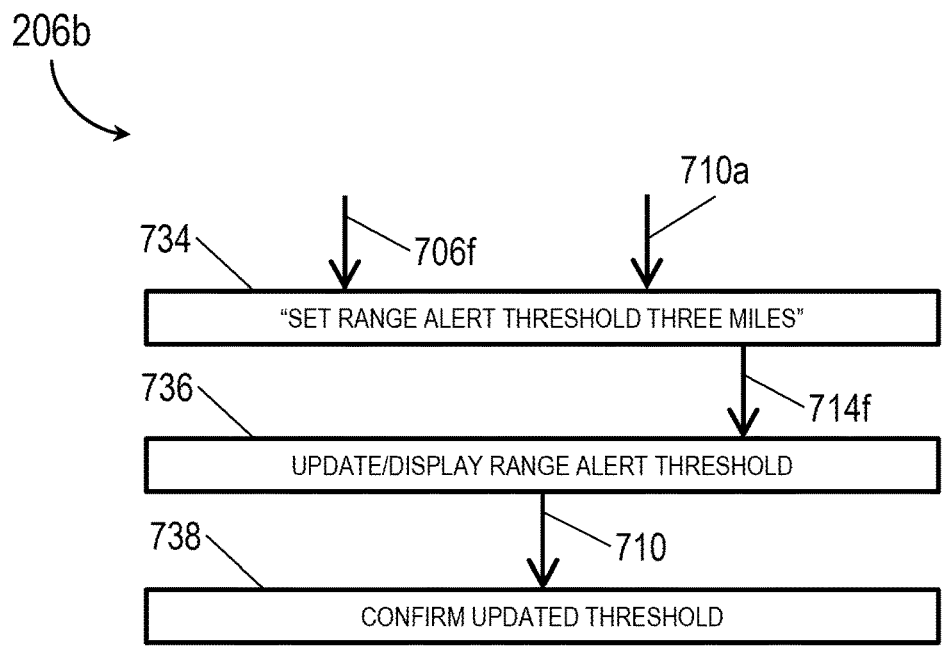

Referring generally to FIGS. 7B through 7D, example operations of the voice-activated command system 206b are disclosed.

In embodiments, referring in particular to FIG. 7B, the pilot may activate the HUD 100b traffic overlay (708) by quickly pressing and releasing (710) the control knob 702 (or, e.g., deactivate the HUD traffic overlay if it is currently active). In some embodiments, activation of the HUD 100b traffic overlay (708) may also be voice-activated. For example, as an alternative to pressing and releasing (710) the control knob 702, the pilot may activate the HUD 100b traffic overlay (708) by speaking a predetermined command word or phrase (710a; e.g., "WAKEUP") followed by a specific traffic overlay command (e.g., "TRAFFIC ELEVEN O'CLOCK THREE THOUSAND" (712)). Similarly, in some embodiments the HUD 100b traffic overlay may be prepared for spoken traffic overlay commands (e.g., as described below) by spoken command phrases 710a (e.g., "WAKEUP", "READY") as an alternative to holding down (706a) the control knob 702.

In embodiments, the pilot may verbally highlight or select traffic targets based on the position of identified proximate traffic targets providing traffic information (e.g., proximate aircraft (112, FIG. 1) identified by the HUD 100b with interactive traffic symbols (114, FIG. 1) displayed by the HUD. For example, given an active HUD 100b traffic overlay (708) the pilot may hold down (706a) the control knob 702, say, e.g., "TRAFFIC ELEVEN O'CLOCK THREE THOUSAND" (712), and release (714a) the control knob, directing the HUD 100b to highlight a traffic target, e.g., an interactive traffic symbol (114, FIG. 1) corresponding to a proximate aircraft at a heading around 330 degrees relative to the ownship (e.g., ahead and slightly to port) and at an altitude around 3,000 ft MSL. If no air traffic is found at or near this position, the HUD 100b may so indicate via visual or aural alert, e.g., "NO TRAFFIC TARGETS AVAILABLE". If a traffic target is found at or near the indicated position, the HUD 100b may highlight the interactive traffic symbol 114 corresponding to the traffic target with a displayed cursor (116, FIG. 1).

In embodiments, the HUD 100b may identify multiple traffic targets at or near the location indicated by the pilot, or may highlight a traffic target other than the desired traffic target (716). By holding down (706b) the control knob 702, saying, e.g., "CYCLE LEFT"/"CYCLE RIGHT" or "NEXT TARGET"/"PREVIOUS TARGET" (718), and releasing the control knob (714b), the pilot may scroll through identified traffic targets in ascending or descending order of priority until the desired traffic target is highlighted (720). By holding down (706c) the control knob 702, saying, e.g., "DESIGNATE TRAFFIC FOR CAVS [e.g., or another desired spacing or traffic application]" (722), and releasing the control knob (714c), the highlighted traffic target may be designated for the desired application (724). Similarly, to terminate a designated application, the pilot may hold down (706d) the control knob 702, say, e.g., "CANCEL [e.g., END/TERMINATE] CAVS" (726), and releasing the control knob (714d), terminating the application (728).

In embodiments, referring also to FIG. 7C, the voice-activated command system 206b may allow the pilot to designate a specific traffic target for spacing or traffic applications based on the tail number or identifier (402, FIG. 4) provided by the proximate aircraft 112 and displayed adjacent to the interactive traffic symbol 114 for the proximate aircraft. For example, the pilot may hold down (706e) the control knob 702 (or provide spoken command phrases 710a), say "DESIGNATE NOVEMBER-SIX-ZERO-ROMEO-CHARLIE FOR CAVS [or other desired application]" (730), and release (714e) the control knob. The HUD 100b may identify the traffic target corresponding to the proximate aircraft 112 having tail number N60RC (402) and designate the aircraft (if said aircraft is found) for traffic applications (732).

In embodiments, referring also to FIG. 7D, the voice-activated command system 206b may allow the pilot to set or update other HUD or traffic overlay parameters. For example, the pilot may hold down (706f) the control knob 702 (or provide spoken command phrases 710a), say "SET RANGE ALERT THRESHOLD THREE MILES (734), and release (714f) the control knob, updating the threshold range to 3 NM and displaying the updated range (736) via the HUD 100b. By pressing and releasing (710) the control knob 702, the updated threshold range may be confirmed by the HUD 100b (738).

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A method for interactive display of traffic targets via a heads-up display (HUD), the method comprising:
    receiving, via at least one surveillance system of an aircraft, traffic information associated with one or more proximate aircraft within a threshold range of the aircraft, the one or more proximate aircraft including at least one first proximate aircraft within a field of view (FOV) of the HUD, the HUD configured for one or more synthetic display feeds corresponding to the HUD FOV, and at least one parked aircraft within the threshold range but outside the HUD FOV;
    organizing each proximate aircraft into an ordered sequence according to one or more proximity criteria, wherein the ordered sequence corresponds to an order in which the one or more proximate aircraft are traversable by a displayed cursor;
    displaying, via the HUD, one or more interactive traffic symbols, each interactive traffic symbol corresponding to a relative position of each proximate aircraft and indicating a status of the proximate aircraft;
    accepting, via a heads-up controller, control input from an operator of the aircraft;
    sequentially transitioning, via the HUD, each proximate aircraft to a highlighted status by traversing the ordered sequence with the displayed cursor based on the accepted control input;
    transitioning, via the HUD, at least one highlighted proximate aircraft to a selected status based on the accepted control input;
    and
    designating, via the HUD, at least one selected proximate aircraft for at least one traffic application based on the accepted control input.

2. The method of claim 1, wherein displaying, via the HUD, one or more interactive traffic symbols, each interactive traffic symbol corresponding to a relative position of each proximate aircraft and indicating a status of the proximate aircraft includes:
    displaying at least one first traffic symbol corresponding to the relative position of each first proximate aircraft; and
    displaying, within the HUD FOV, at least one second traffic symbol associated with the at least one parked proximate aircraft.

3. The method of claim 2, wherein displaying, within the HUD FOV, at least one second traffic symbol associated with the at least one parked proximate aircraft includes:
    displaying, at least one second traffic symbol associated with the at least one parked proximate aircraft along an edge of the HUD.

4. The method of claim 1, wherein displaying, via the HUD, one or more interactive traffic symbols corresponding to the relative positions of the one or more proximate aircraft and indicating a status of each proximate aircraft includes:
    displaying identifying information corresponding to the proximate aircraft.

5. The method of claim 1, wherein displaying, via the HUD, one or more interactive traffic symbols, each interactive traffic symbol corresponding to a relative position of each proximate aircraft and indicating a status of the proximate aircraft includes:
    displaying additional traffic information associated with the proximate aircraft.

6. The method of claim 5, wherein displaying additional traffic information associated with the proximate aircraft includes:
    displaying the additional traffic information via a dynamic display.

7. The method of claim 5, wherein displaying additional traffic information associated with the proximate aircraft includes displaying additional traffic information selected from a group including:
    relative position information;
    airspeed information;
    trajectory information;
    or
    spacing information.

8. The method of claim 1, wherein displaying, via the HUD, one or more interactive traffic symbols, each interactive traffic symbol corresponding to a relative position of each proximate aircraft and indicating a status of the proximate aircraft includes:
    displaying, via the HUD, at least one interactive traffic symbol having an increased prominence based on a higher priority of the corresponding proximate aircraft within the ordered sequence.

9. The method of claim 1, wherein displaying, via the HUD, one or more interactive traffic symbols, each interactive traffic symbol corresponding to a relative position of each proximate aircraft and indicating a status of the proximate aircraft includes:
    displaying, via the HUD, at least one interactive traffic symbol having a reduced prominence based on a lower priority of the corresponding proximate aircraft within the ordered sequence.

10. The method of claim 1, wherein the HUD is configured for display of one or more synthetic display feeds corresponding to the HUD FOV;
    and
    wherein displaying, via the HUD, one or more interactive traffic symbols, each interactive traffic symbol corresponding to a relative position of each proximate aircraft and indicating a status of the proximate aircraft includes:
    superimposing the one or more interactive traffic symbols over the one or more synthetic display feeds displayed by the HUD.

11. The method of claim 1, further comprising:
    automatically discontinuing the displaying of the one or more interactive traffic symbols based on an unusual attitude of the aircraft.

12. The method of claim 1, further comprising:
    automatically discontinuing the displaying of the one or more interactive traffic symbols based on a resolution advisory (RA) issued by a traffic collision avoidance system (TCAS) of the aircraft.

13. The method of claim 1, further comprising:
    discontinuing the displaying of the one or more interactive traffic symbols based on the accepted control input.

14. The method of claim 1, further comprising:
detecting at least one of a data loss and a data fault associated with the traffic information; and
removing the at least one interactive traffic symbol associated with the data loss or the data fault.

* * * * *